United States Patent
Schubert et al.

[11] Patent Number: 5,960,783
[45] Date of Patent: *Oct. 5, 1999

[54] IGNITION SYSTEM WITH DUAL ELECTRODES AND LIGHTER TUBE ASSEMBLY

[75] Inventors: Henry C. Schubert; Kurt R. Beckman, both of Neosho; Michael R. Giebel, Joplin, all of Mo.

[73] Assignee: Sunbeam Products, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/907,550

[22] Filed: Aug. 8, 1997

[51] Int. Cl.⁶ ............................................. F24C 3/00
[52] U.S. Cl. ........................ 126/41 R; 431/264; 431/266
[58] Field of Search .......................... 431/255, 286, 431/280, 264, 266; 126/41 R

[56] References Cited

U.S. PATENT DOCUMENTS

| | | | |
|---|---|---|---|
| 2,292,664 | 8/1942 | Schwartz | 431/265 |
| 3,408,153 | 10/1968 | Ishiguro | 431/255 |
| 3,428,408 | 2/1969 | Ameyama et al. | 431/255 |
| 3,759,658 | 9/1973 | Mifune et al. | 431/255 |
| 4,302,181 | 11/1981 | Schlosser | 431/264 |
| 4,887,959 | 12/1989 | Shellenberger | 431/286 |
| 4,905,660 | 3/1990 | Leduc | 126/41 R |
| 4,941,817 | 7/1990 | Schlosser . | |
| 4,954,078 | 9/1990 | Nelson | 431/255 |
| 5,000,676 | 3/1991 | Fiala | 431/255 |
| 5,127,824 | 7/1992 | Barker | 126/41 R |
| 5,186,159 | 2/1993 | Crow, Jr. et al. . | |
| 5,613,486 | 3/1997 | Johnston | 126/41 R |

*Primary Examiner*—Carroll Dority
*Attorney, Agent, or Firm*—Kramer, Levin, Naftalis & Frankel LLP

[57] ABSTRACT

An improved ignition system for igniting combustible gas used in cooking and other types of devices. The ignition system includes an ignition mechanism having a spark generator that is electrically connected to two electrodes. When the spark generator is activated, a spark is produced between the electrodes which ignites combustible gas emanating from a burner. The ignition system also includes a lighter tube assembly having a lighter tube that extends from a main burner to secondary burners. The lighter tube is connected to a dual valve which provides gas flow to both the lighter tube and to the main burner. An ignition mechanism is provided which ignites the gas emanating from both the main burner and lighter tube, thus enabling the secondary burners to subsequently be ignited via the lighter tube.

9 Claims, 4 Drawing Sheets

IGNITION SYSTEM WITH DUAL ELECTRODES AND LIGHTER TUBE ASSEMBLY

FIELD OF INVENTION

The present invention relates to ignition systems for use in connection with devices such as grills that use combustible gas as a source of heat energy.

DESCRIPTION OF THE RELATED ART

Many cooking devices employ burners which use combustible gas as the source of heat energy for the cooking of food products. In these devices, efforts have been made to simplify the igniting of the gas burners. For example, ignition mechanisms have been designed which eliminate the need for manual ignition via matches. Typically, these prior art ignition mechanisms employ a spark generator (source of high voltage) that is connected to a single electrode and function by creating an arc (spark) between the electrode and a burner which forms the ground. The arc then ignites the gas emanating from the burner.

Although the prior art ignition mechanisms have generally worked well, the design of these mechanisms leaves them susceptible to failure in certain circumstances. For example, the electrode, or the wire connecting the electrode to the spark generator, can be inadvertently shorted to ground, thus preventing a spark from being generated between the electrode and the burner. Such a short can be caused by a variety of reasons such as the excessive dripping and buildup of food stuffs on the ignition mechanism. In such circumstances, the gas most likely is not ignited, causing the ignition mechanism to thereby fail.

In addition to shortcomings in the prior art ignition mechanisms, the prior art has not provided a simple and efficient means by which to ignite multiple burners in a cooking device. Modern grills typically have a multiple of burners, several of which are commonly beneath a primary cooking surface enclosed by the main cover of the grill, with some models also having "side burners" separate from the primary cooking surface. In order to ignite such multiple burners, the prior art has typically provided a separate ignition mechanism for each and every burner. Although capable of adequately igniting the multiple burners in most situations (though each such mechanism is still susceptible to failure due to shorting as described above), the requirement of multiple ignition mechanisms causes the prior art methodology to be overly complicated and inefficient.

Thus, an ignition system is needed that can more reliably ignite a burner, and that can ignite multiple burners in a less complex and more efficient manner.

SUMMARY OF THE INVENTION

The present invention provides an ignition system which meets all of the above-identified needs.

The ignition system of the present invention includes an ignition mechanism for igniting a single gas burner, the ignition mechanism having a spark generator that is electrically connected to two electrodes. Each of the electrodes has an electrode end which is in close physical proximity to the gas burner. When activated, the spark generator produces a high voltage which is realized across the electrode ends of the electrodes, thereby producing a spark therebetween which ignites the gas emanating from the gas burner.

In another embodiment, the ignition system of the present invention includes an ignition mechanism for igniting multiple gas burners, the ignition mechanism having electrode-electrode connections in addition to a spark generator that is electrically connected to two electrodes. The electrodes are arranged to form a series circuit with each burner having a set of two electrodes. When activated, the spark generator produces a high voltage which is realized across the electrode ends of each set of electrodes, thereby producing a spark at each set of electrodes which ignite the gas emanating from each of the multiple gas burners.

The ignition system of the present invention also includes a lighter tube assembly for igniting multiple gas burners. The assembly includes a lighter tube that extends from a main burner to secondary burners, the lighter tube having burner ports which are in close proximity to both the main burner and the secondary burners. The lighter tube is connected to a dual valve which provides gas flow to both the lighter tube and to the main burner. An ignition mechanism is provided which ignites the gas emanating from both the main burner and the lighter tube. Secondary burners can then be subsequently ignited via the already ignited gas emanating from the burner ports of the lighter tube.

Other details, objects and advantages of the present preferred embodiment will become more apparent with the following description of the present invention.

DETAILED DESCRIPTION OF THE INVENTION

The ignition system of the present invention can be implemented in all types of cooking devices that use combustible gas as the source of heat energy, including, but not limited to, grills, stoves, and ovens. Furthermore, the ignition mechanism of the present invention can also be implemented in any device that requires the igniting of combustible gas, including, but not limited to, furnaces, water heaters, and space heaters. The following description focuses on the present invention's application within an outdoor grill for the purposes of explanation.

Figure 1:
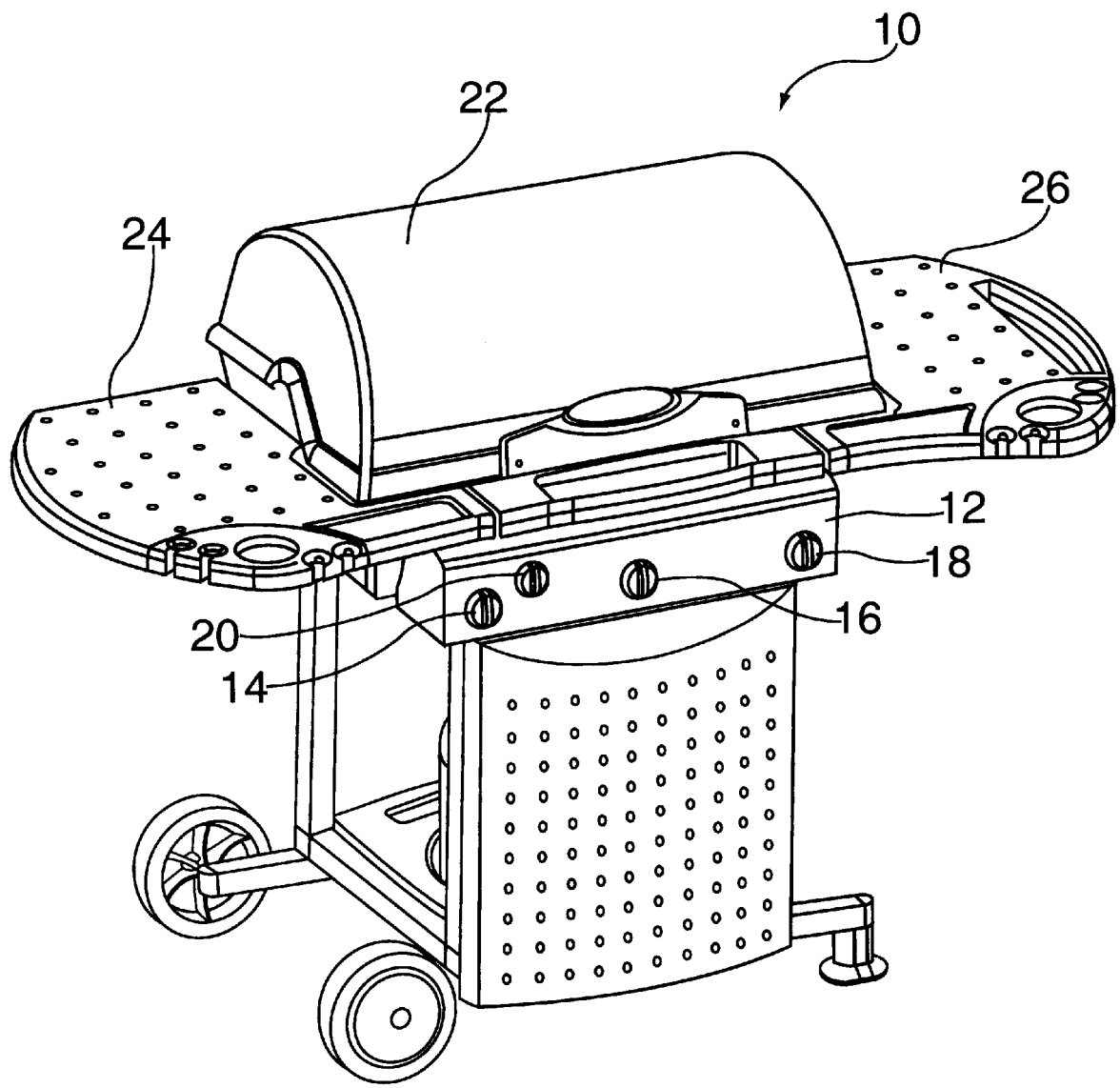
FIG. 1 is a perspective view of a typical grill embodying the ignition system of the present invention.

Referring first to FIG. 1, shown is a grill 10 in which the ignition system of the present invention may be found. Grill 10 includes a control panel 12 having four controls 14, 16, 18, and 20. As described in more detail below, controls 14, 16, and 18 are gas controls, each of which controls the amount of gas that flows from a burner within grill 10. Although three gas controls are shown which correspond to three internal burners, it should be recognized that any number of gas controls and corresponding burners may be used. Control 20 is an ignition control which causes gas to be ignited, as described in more detail below. Grill 10 conventionally includes a cover 22 beneath which burners (not shown) are located, and includes side hinges 24 and 26 which, although not shown, may include side burners.

Figure 2:
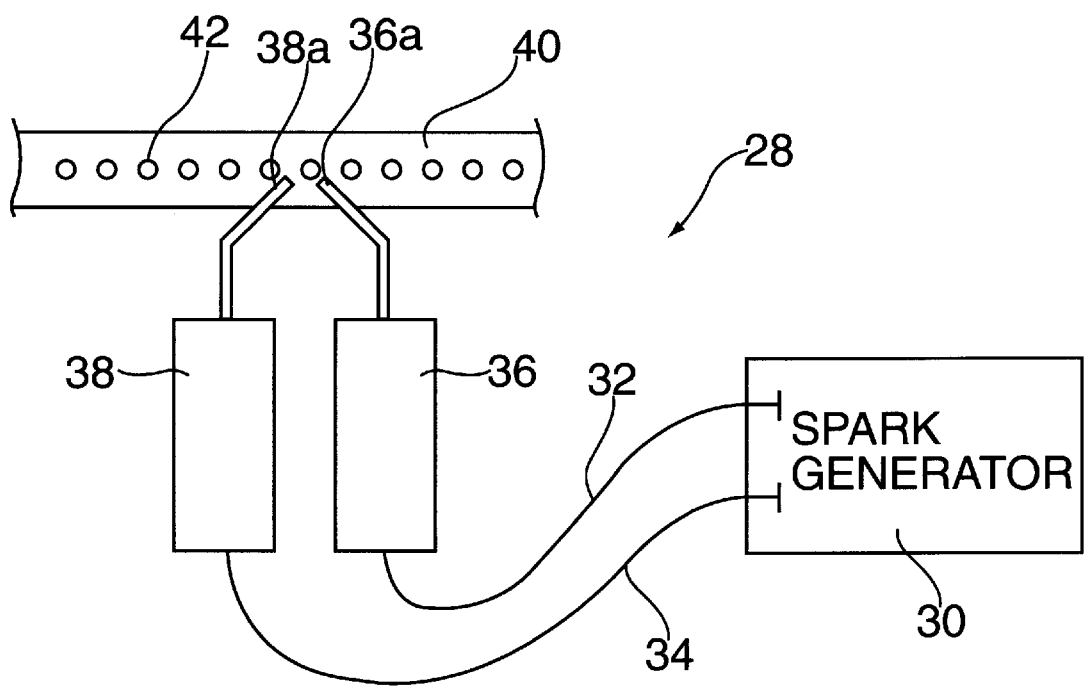
FIG. 2 is a schematic diagram of an ignition mechanism of the present invention.

Referring now to FIG. 2, shown is an ignition mechanism 28 according to the present invention that can be implemented in grill 10. Ignition mechanism 28 includes a spark generator 30 that is electrically connected via conductive wires 32 and 34 to electrodes 36 and 38, respectively. Electrodes 36 and 38 are conventional in design, and have electrode ends 36a and 38a that are positioned in close physical proximity to a burner 40 having a multitude of burner ports 42 through which gas emanates. Electrodes 36 and 38 preferably are comprised of electrode wire and an unglazed ceramic insulator of L5 steatite material.

Spark generator 30 is controlled in a conventional manner via ignition control 20 and, when actuated, functions as a high voltage source. In the situation where ignition control 20 is a rotary knob as shown in FIG. 1, spark generator 30 preferably comprises a rotary piezo ignitor. However, spark generator 30 may alternatively consist of a push-button piezo ignitor, or an electric ignitor that is connected to battery or line voltage, with an appropriate conventional structure being used for ignition control 20 instead of a rotary knob. Spark generator 30 is connected to electrodes 36 and 38 in a manner so as to form a conventional series electrical circuit, with a circuit path extending from generator 30 to electrode 36 via wire 32, across the gap between electrode ends 36a and 38a of electrodes 36 and 38, and back to generator 30 via wire 34. Unlike prior art ignition mechanisms, the circuit of the ignition mechanism of the present invention is not grounded to burner 40 or to any other portion of grill 10. In this circuit, substantially all of the high voltage generated by spark generator 30 is realized across the electrodes 36, 38, thereby producing a spark between electrode ends 36a and 38a.

In operation, the operator of grill 10 initiates an ignition cycle by rotating one of the gas controls 14, 16, or 18 (FIG. 1) to an "ON" position, thereby causing gas to flow out of burner ports 42 of burner 40, the amount of gas being proportional to the degree to which the control is rotated. Next, the operator activates ignition control 20, thereby actuating spark generator 30 and generating a high voltage across electrodes 36 and 38. The potential difference across electrodes 36 and 38 produces a spark therebetween which ignites the gas flowing out of burner ports 42, thereby successfully completing the ignition cycle.

Preferably, electrode ends 36a and 38a of electrodes 36, 38 are approximately four millimeters apart, and are positioned approximately five millimeters away from burner 40. As such, with the distance between electrodes 36, 38 less than the distance from the electrodes to burner 40, the spark should always be produced between the electrodes. However, the ignition mechanism of the present invention also functions if the distance between the electrodes is more than the distance from the electrodes to the burner. In this situation, the circuit path most likely includes the portion of burner 40 between electrode ends 36a and 38a, with two sparks being generated to ignite the gas, one between the higher potential electrode and the burner, and one between the burner and the lower potential electrode.

Figure 3:
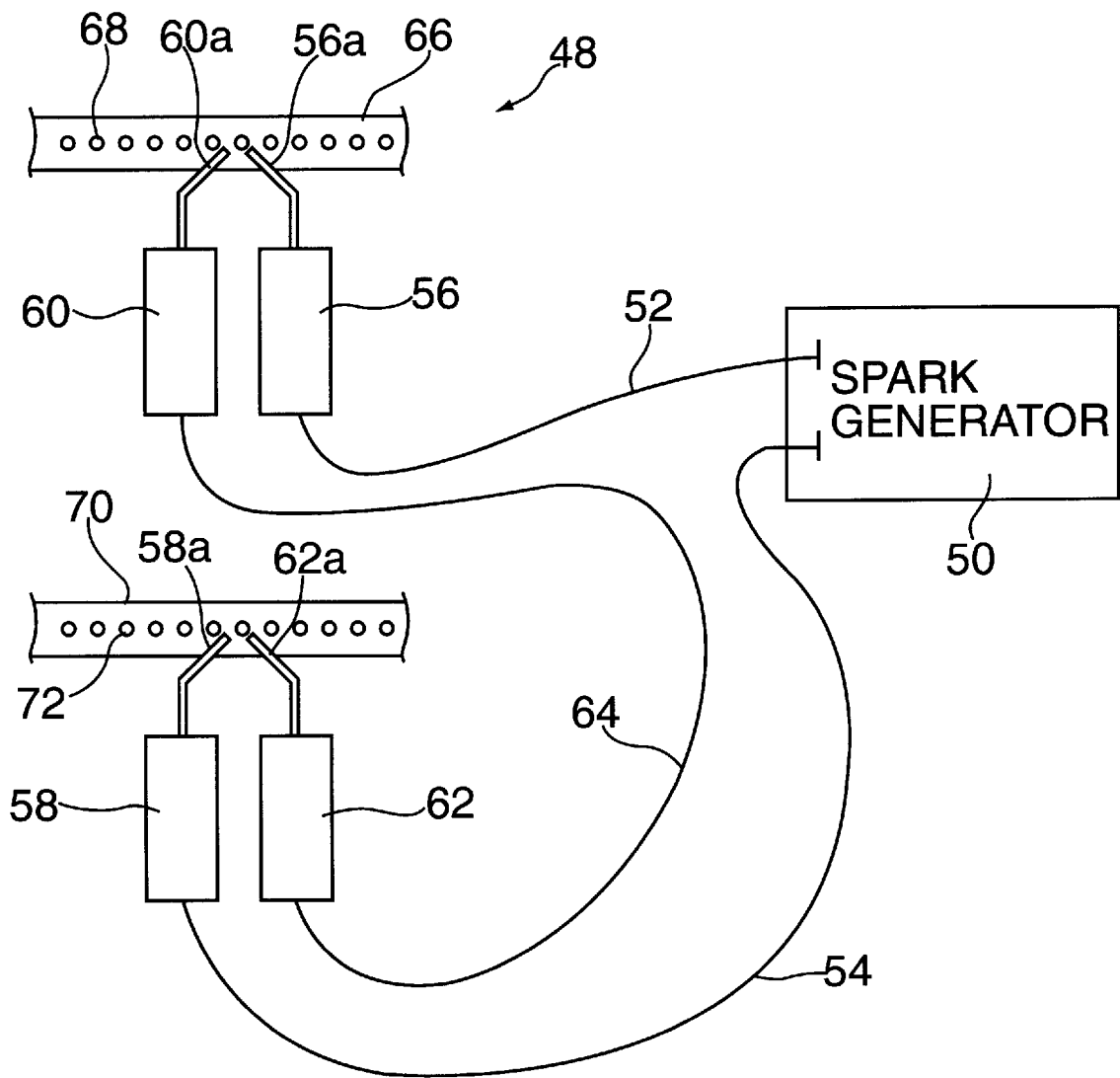
FIG. 3 is a schematic diagram of an alternate embodiment of the ignition mechanism.

Referring now to FIG. 3, shown is an ignition mechanism 48 according to another embodiment of the present invention which can be implemented for igniting dual burners in grill 10 from only one spark generator. Ignition mechanism 48 includes a spark generator 50 that is electrically connected via conductive wires 52 and 54 to electrodes 56 and 58, respectively. Also shown are electrodes 60 and 62 that are electrically connected via conductive wire 64. Electrodes 56, 58, 60, and 62 are conventional in design, and have electrode ends 56a, 58a, 60a, and 62a, respectively. Electrode ends 56a and 60a are positioned in close physical proximity to a burner 66 having a multitude of burner ports 68 through which gas emanates. Electrode ends 58a and 62a are positioned in close physical proximity to a burner 70 having a multitude of burner ports 72 through which gas emanates. As before, electrodes 56, 58, 60, and 62 preferably are comprised of electrode wire and an unglazed ceramic insulator of L5 steatite material.

In the manner described above in connection with ignition mechanism 28 shown in FIG. 2, spark generator 50 is controlled via ignition control 20 and, when actuated, functions as a high voltage source. Spark generator 50 is connected to electrodes 56 and 58 in a manner so as to form a conventional series electrical circuit, with one electrode at a higher potential than the other. The circuit path of this embodiment extends from generator 50 to electrode 56 via wire 52, across the gap between electrode ends 56a and 60a of electrodes 56 and 60, to electrode 62 via wire 64, across the gap between electrode ends 62a and 58a of electrodes 62 and 58, and back to generator 50 via wire 54. In this circuit, substantially all of the high voltage generated by spark generator 50 is realized across two sets of electrodes, thereby producing a spark between electrode ends 56a and 60a, and a spark between electrode ends 62a and 58a. As before, the circuit of the ignition mechanism is not grounded to burner 66 or burner 70, or to any other portion of grill 10.

In operation, the operator of grill 10 initiates an ignition cycle by rotating two of the gas controls 14, 16, or 18 (FIG. 1) to an "ON" position, thereby causing gas to flow out of burner ports 68 and 72 of burners 66 and 70, respectively. Next, the operator activates ignition control 20, thereby actuating spark generator 50 and generating a high voltage across electrodes 56 and 60 and across electrodes 62 and 58. The potential difference across each set of electrodes produces a spark at each of the electrode sets which ignite the gas flowing out of burner ports 68 and 72, thereby successfully completing the ignition cycle for both of burners 66 and 70.

As described above in connection with ignition mechanism 28 of FIG. 2, electrode ends 56a and 60a of electrodes 56, 60, and electrode ends 62a and 58a of electrodes 62, 58, are preferably approximately four millimeters apart, with each set of electrode ends approximately five millimeters away from their respective burners. As such, one spark should always be produced between the electrode ends of each of the two sets of electrodes. However, as described above, the ignition mechanism of this embodiment also functions if the distance between each set of electrode ends is more than the distance from the electrode ends to the burners. In this situation, two sparks most likely are generated at each set of electrodes, in the same manner as described above in connection with FIG. 2.

It should be recognized that igniting mechanism 48 shown in FIG. 3 can be adapted to ignite more than two burners from a single spark generator. In such a situation, the spark generator and electrodes would be connected in series circuit fashion, with multiple electrode-electrode connections (for example, the connection between electrode 60 and electrode 62 via wire 64) being implemented so that each burner has a set of two electrodes. A spark would thus be generated at each set of electrodes, as described above, provided that the voltage generated by the spark generator is high enough to accommodate sufficient voltage drops between the electrode ends of each set of electrodes.

The igniting mechanisms shown in FIGS. 2 and 3 and described above are much more reliable than the igniting mechanisms of the prior art. In particular, the igniting mechanisms of the present invention avoid many of the problems that can occur when an electrode or a conductive wire becomes inadvertently shorted to ground. This is because the new igniting mechanisms do not rely on a grounded surface to create a spark since the circuit paths thereof are not grounded to any portion of grill 10. As such, the likelihood of a spark being generated, at an appropriate location by which to ignite the combustible gas, is greatly increased.

Figure 4:
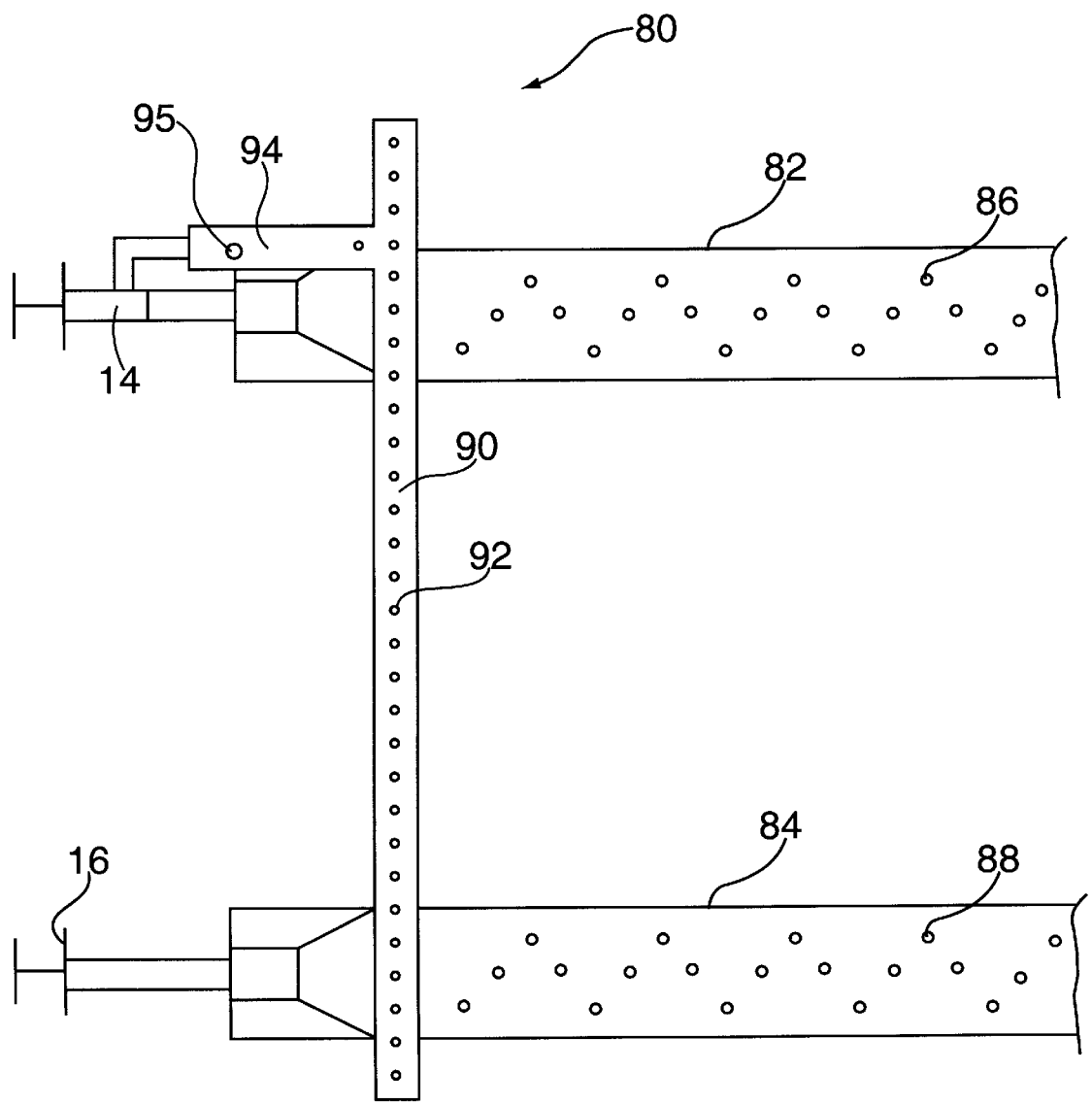
FIG. 4 is a schematic diagram of a lighter tube assembly of the present invention.

Referring now to FIG. 4, shown is a lighter tube assembly 80 of the present invention that can be implemented in grill 10 to sequentially ignite a series of burners with a single igniting mechanism. Shown are conventional burners 82 and 84 each having a multitude of burner ports 86 and 88, respectively, from which gas emanates. Burner 82 is a main burner, and is supplied with a source of combustible gas via a gas control which, with reference to FIG. 1, corresponds to gas control 14. Burner 84 is a secondary burner, and is supplied with a source of combustible gas via a gas control which, with reference to FIG. 1, corresponds to gas control 16.

Also shown in FIG. 4 is a lighter tube 90, preferably comprised of stainless steel, having a multitude of burner ports 92, of conventional size and shape, from which gas emanates, as described below. A portion of burner ports 92 of lighter tube 90 are in close physical proximity to a portion of burner ports 86 of main burner 82. Lighter tube 90 includes an arm 94 that connects the main body of tube 90 to gas control 14. Lighter tube 90 preferably also includes a primary air inlet 95, used with most conventional burners, in order to draw in primary air for mixture with the combustible gas so as to provide a proper combustion mixture. The main body of lighter tube 90 extends from main burner 82 to secondary burner 84, with a portion of burner ports 92 of lighter tube 90 in close physical proximity to a portion of burner ports 88 of secondary burner 84.

Gas control 14 is comprised of a conventional two-ported spool valve, preferably fabricated of brass, with one port providing gas flow to lighter tube 90, and the other port providing gas flow to main burner 82. The spool is machined to allow gas to flow, only when gas control 14 is in an "ON" position, substantially simultaneously to both lighter tube 90 and main burner 82. The port for the main burner 82 is drilled such that rotation of the spool (via rotation of the knob for gas control 14) causes the size of the port's opening to be changed, thereby enabling the gas flow to the main burner to be adjusted. However, the port for lighter tube 90 is drilled such that the gas flow supplied to lighter tube 90 is constant, at manifold pressure, regardless of the position or rotation of the spool, so long as gas control 14 is in an "ON" position.

Although not shown, an igniting mechanism is implemented in close physical proximity to a portion of the burner ports of each of main burner 82 and lighter tube 90, and is controlled via ignition control 20 (FIG. 1). Preferably, the igniting mechanism is of the dual electrode type described above and shown in FIG. 2, although any conventional igniting mechanism could be used.

In operation, the operator of grill 10 initiates an ignition cycle by rotating gas control 14 to an "ON" position, thereby causing gas to substantially simultaneously flow out of the burner ports of both main burner 82 and lighter tube 90. As mentioned above, dual valve 14 maintains a constant flow of gas to lighter tube 90, whereas the flow of gas to main burner 82 is dependent on the position of the rotary knob of control 14. Next, the operator activates the igniting mechanism via ignition control 20 (FIG. 1), thereby causing the gas flowing out of both main burner 82 and lighter tube 90 to be substantially simultaneously ignited. Now, if the operator desires to ignite secondary burner 84 while main burner 82 is ignited, the operator need only rotate gas control 16 to an "ON" position, whereby the gas caused to flow out of burner ports 88 will automatically be ignited via the already ignited gas emanating from burner ports 92 of lighter tube 90. As such, lighter tube assembly 80 of the present invention provides for a sequential igniting of multiple burners in grill 10, with the sequential igniting starting with the ignition of main burner 82.

Although only one secondary burner 84 is shown in FIG. 4, it should be recognized that more than one secondary burner may be associated with lighter tube assembly 80. In this multiple secondary burner embodiment, lighter tube 90 extends to all such secondary burners, with at least a portion of burner ports 92 of lighter tube 90 in close physical proximity to at least a portion of the burner ports of each secondary burner. Any of the secondary burners may be ignited at any time without regard to the igniting of other secondary burners, so long as main burner 82 is already ignited. After ignition of the desired secondary burners, main burner 82 may then be shut off via gas control 14, which also shuts off lighter tube 90.

It should be recognized that the amount of gas that is required to flow to lighter tube 90 via dual valve 14 is dependent on the length of lighter tube 90. The port in dual valve 14 providing flow to lighter tube 90 should be large enough to enable all burner ports 92 to adequately maintain a flame at all times.

Furthermore, it should be recognized that the lighter tube assembly of the present invention can be implemented without a dual valve. In such an embodiment, the lighter tube could have a gas control and ignition mechanism that are independent of the conventional burners. The lighter tube in this embodiment, as before, would extend to all of the burners in which sequential ignition is desired, and would, after ignition, enable all other burners to be ignited from the lighter tube without the need for additional ignition mechanisms.

The lighter tube assembly of the present invention provides a less complex and more efficient method of igniting multiple burners, and thus is a significant improvement over the prior art.

While the present preferred embodiment of the invention have been described herein, it is distinctively understood that the invention is not limited thereto, but may be otherwise variously embodied within the scope of the following claims and any equivalence thereof.

We claim:

1. An ignition system for igniting combustible gas emanating from a first and second gas burner in a gas grill, the system comprising:

an ignition control, a spark generator for providing a source of high voltage in response to said ignition control, a first pair of electrodes located near the first gas burner, said first pair of electrodes comprising a first and second electrode, the first electrode connected to the spark generator by a first insulated conductor, and a second pair of electrodes located near the second gas burner, said second pair of electrodes comprising a third and fourth electrode, the third electrode connected to the second electrode by the interconnecting insulated conductor, and the fourth electrode connected to the spark generator by a second insulated conductor.

2. The ignition system of claim 1, where upon actuation of the ignition control, a first spark is generated between the first and second electrode and a second spark is generated between the third and fourth electrode.

3. The ignition system of claim 1, where upon actuation of the ignition control, a first spark is generated between the first electrode and the first burner, a second spark is generated between the first burner and the second electrode, and a third spark is generated between the third and fourth electrode.

4. The ignition system of claim 1, where upon actuation of the ignition control, a first spark is generated between the first electrode and the second electrode, a second spark is generated between the third electrode and the second burner, and a third spark is generated between the second burner and the fourth electrode.

5. The ignition system of claim 1, where upon actuation of the ignition control, a first spark is generated between the first electrode and the first burner, a second spark is generated between the first burner and the second electrode, a third spark is generated between the third electrode and the second burner, and a fourth spark is generated between the second burner and the fourth electrode.

6. The ignition system of claim 1, where a complete electrically conductive path is formed between the spark generator, the first pair of electrodes, and the second pair of electrodes.

7. The ignition system of claim 6, wherein the electrically conductive path of the ignition system is not grounded to any portion of the gas grill.

8. The ignition system of claim 1, wherein for each gas burner in excess of two in the gas grill, there is provided a respective intermediate pair of electrodes located near each extra gas burner.

9. The ignition system of claim 8, wherein a complete electrically conductive path is formed between the spark generator, the first pair of electrodes, the respective intermediate pair of electrodes, and the second pair of electrodes, and is not grounded to any portion of the gas grill.

\* \* \* \* \*